Figure 1:
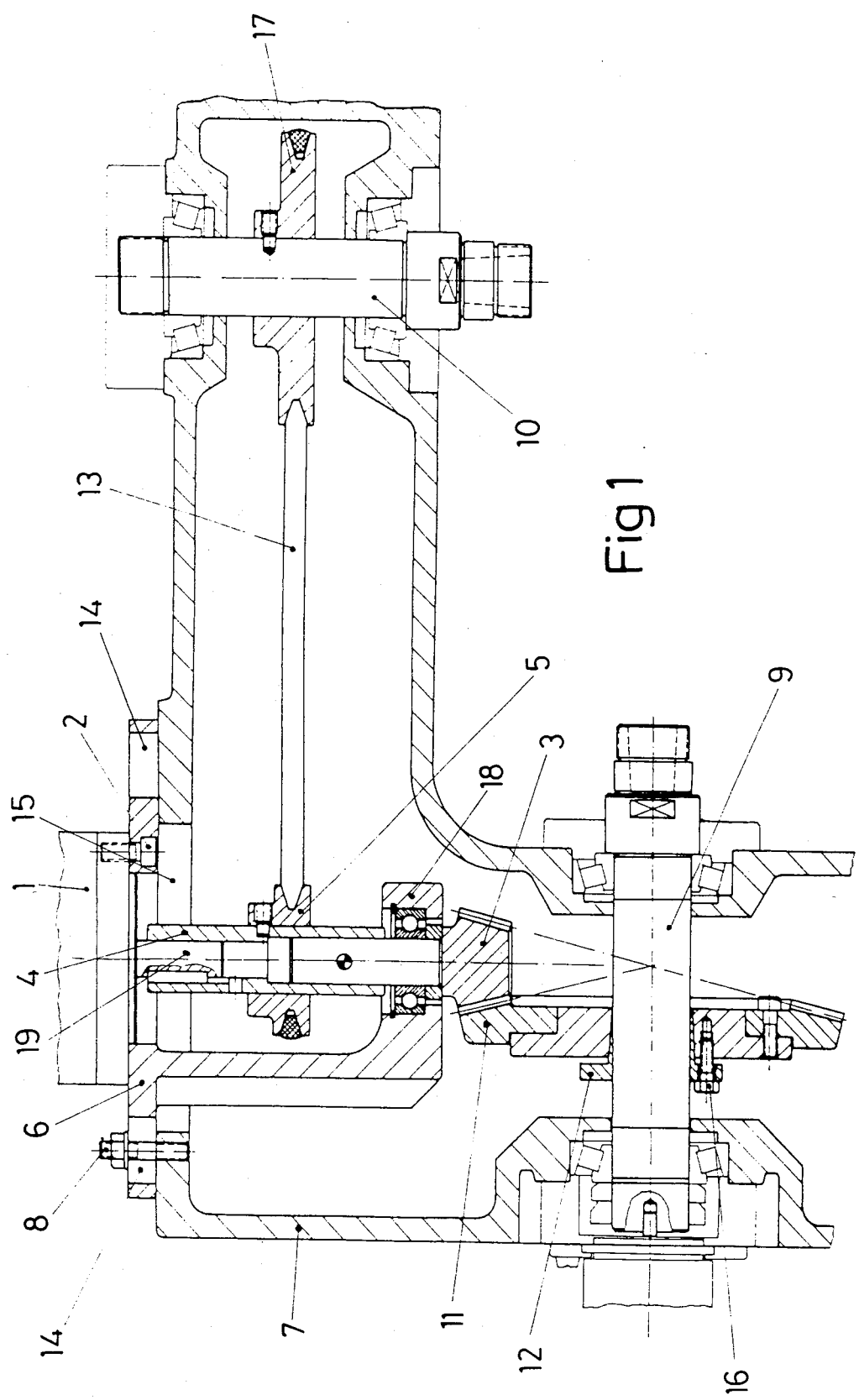

United States Patent [19]

Donazar

[11] Patent Number: 4,721,012

[45] Date of Patent: Jan. 26, 1988

[54] POWER TRANSMISSION FOR MACHINE TOOLS

[75] Inventor: Jose A. Y. Donazar, Legazpia, Spain

[73] Assignee: ALECOOP, S. Coop., Spain

[21] Appl. No.: 804,678

[22] Filed: Dec. 4, 1985

[30] Foreign Application Priority Data

Dec. 4, 1984 [ES] Spain ..................................... 283.154

[51] Int. Cl.⁴ ..................... F16H 37/06; F16H 35/06; F16H 1/14

[52] U.S. Cl. .................. 74/665 G; 74/397; 74/417; 474/114

[58] Field of Search ................ 74/664, 665 F, 665 G, 74/665 H, 665 GB, 665 GC, 665 GE, 606 R, 417, 423, 400, 397, 416; 474/114; 180/247; 1/251

[56] References Cited

U.S. PATENT DOCUMENTS

| | | | |
|---|---|---|---|
| 1,065,763 | 6/1913 | Angebrandt, Jr. | 74/400 |
| 1,232,342 | 7/1917 | Liles | 74/15.88 X |
| 1,278,531 | 9/1918 | Wallbillich | 74/400 |
| 1,498,217 | 6/1924 | Walker | 74/665 GC |
| 1,540,935 | 6/1925 | Fone | 74/15.88 |
| 1,858,700 | 5/1932 | Besonson | 74/15.88 X |
| 2,011,355 | 8/1935 | Devener et al. | 74/606 R X |
| 2,883,122 | 4/1959 | Le Baron Bowen, Jr. | 74/689 X |
| 2,889,716 | 6/1959 | Doty | 74/689 |
| 2,891,412 | 6/1959 | Jackson | 74/423 |
| 3,257,867 | 6/1966 | Dennick | 74/664 C X |
| 4,111,069 | 9/1978 | Blair et al. | 74/606 R |
| 4,381,828 | 5/1983 | Lunn et al. | 180/247 |
| 4,484,654 | 11/1984 | Hayakawa | 180/247 |
| 4,622,859 | 11/1986 | Hobson | 74/606 R X |
| 4,631,044 | 12/1986 | Redmon | 474/114 |

FOREIGN PATENT DOCUMENTS 0534663  12/1956  Canada .......................... 74/665 GC Primary Examiner—Dirk Wright
Attorney, Agent, or Firm—Henry C. Nields

[57] ABSTRACT

A power transmission device for machine tools which provides tow driven shafts at a right angle to each other. A first driven shaft is disposed at a right angle to a driving shaft and is driven from a bevel gear on the end of the driving shaft engaging a ring or crown gear on the first driven shaft. A second driven shaft is disposed parallel to the driving shaft and carries a pulley driven from a pulley on the driving shaft. The driving shaft is adjustable toward and away from the second driven shaft to allow adjustment of the tension of a belt disposed around the pulleys, and the ring or crown gear is movable axially on the first driven shaft to allow such adjustment.

1 Claim, 1 Drawing Figure

4,721,012

POWER TRANSMISSION FOR MACHINE TOOLS

The purpose of the present specification is to state the object forming the subject of the exclusive privilege for Industrial and commercial exploitation in the national teeritory of a Utility Model in accordance with current industrial Property Legislation which, as stated in the heading, deals with "IMPROVED POWER TRANSMISSION FOR MACHINE TOOLS."

The most usual arrangement in machine tools with more than one drive shaft consists in providing each shaft with an individual drive motor; otherwise complicated transmissions are used, connected to a single main drive motor.

In either case, a solution is devised for maximum utilization of the useful life of the tool, which is usually done in industrial applications of tools with high powers.

There exist, nonetheless, cases in which the work to be performed calls for low power by tools with more than one output shaft and does not justify investment in expensive and sturdy designs like those mentioned.

Thus, the object of this invention is an improved power transmission for machine tools which simply and inexpensively provides for driving two transverse shafts, one horizontal and the other vertical, and the driving gears and pulleys on them, using physically different systems, namely gears and a belt and pulley system, off the same single drive motor.

Accordingly, the drive motor is provided with a prolonged L-shaped flange which serves to support the main drive shaft coming from the motor.

In accordance with the present invention, the motor flange is provided with elongated holes which allow it to move horizontally within a broad range.

The main drive shaft is provided at its end with a bevel gear which engages a matching beveled crown gear which is mounted by means of a tapered bushing to the horizontal output shaft of the tool.

In addition, in its central zone, the main drive shaft has a pulley perfectly attached thereto by a set screw, said pulley, by means of a belt, transmitting the motion to the vertical output shaft of the tool.

When any play or slack appears in either the belt transmission or in the gears, this play is easily taken up by moving the motor on the elongated holes in its flange, while the crown gear of the horizontal shaft, easily movable, (is adjusted) by means of the tapered bushing.

As may be seen from what has been described above, the mechanism recommended provides a single drive and is easily disassembled, with a minimum of parts, thus considerably reducing wear, breakage, damage, maintenance, etc., thus achieving greater flexibility of the drive assembly with respect to the rest of the tool.

On the other hand, the recommended model has some elements of great structural rigity which ensure perfect functioning under the anticipated conditions, all of which—combined with other design and functional advantages—distinguishes the recommended model from the prior art, giving it a life of its own.

For better understanding of the nature of the present invention, the attached drawing is a schematic representation of its utilization, this being nonlimitative and thus susceptible to accessory modifications which do not alter its essential characteristics.

FIG. 1 shows a section of the tool through its drive zone, in which may be seen the connection between the motor and the tool and the interrelationship between the motor shaft and the two output shafts of the tool.

FIG. 1 also shows the shape of the motor flange as well as the details of attachment of pulleys and gears which constitute the mechanism of the recommended model.

The following features will be noted therein:
Clarifying Details
1. Motor
2. Bolt
3. Bevel gear
4. Main drive shaft
5. Pulley
6. Flange
7. Frame
8. Bolts
9. Horizontal tool shaft
10. Vertical tool shaft
11. Crown
12. Tapered bushing
13. Belt
14. Elongated hole
15. Opening in frame (7)
16. Bolt
17. Driven pulley
18. L-shaped support
19. Motor shaft The model subject of this invention is an improved power transmission for machine tools which, as can be seen from FIG. 1, is basically composed of a drive motor 1 provided with a flange 6 attached to motor 1 by bolts 2 and by the mounting holes of flange 6 itself being elongated holes 14 which permit the passage of bolts 8 which hold motor 1 in place and hence hold main drive shaft 4 in place as an extension of motor shaft 19.

Thus, it can seen seen from FIG. 1 that main drive shaft 4 is provided with two transmission systems, one at its end, a bevel gear 3 which drives crown gear 11 mounted on horizontal tool shaft 9 by means of a tapered bushing 12 adjustable by bolt 16, while at its central zone is a pulley 5 suitably mounted on main drive shaft 4, said pulley by means of a belt 13 transmitting the motion to vertical tool shaft 10 by means of driven pulley 17 attached to said shaft.

Flange 6 of motor 1 extends through an opening 15 in frame 7 forming an L-shaped support 18, which provides the necessary rigidity for the entire drive assembly and the proper flexural strength for main drive shaft 4.

When, due to wear or for any other reason, play develops n the mesh of the gears or slack develops in transmission belt 13 driving vertical tool shaft 10, these defects can easily be corrected by loosening bolts 8 and shifting motor 1 using elongated holes 14 provided in flange 6.

Movement of bevel gear 3 brings crown gear 11 into a new position, which crown gear is easily movable by the type of mounting adopted and consisting of a tapered bushing 12 which can be adjusted to the new position of the assembly by loosening bolt 16.

As can be seen, by an extraordinarily simple procedure like that described, possible play or slack which may occur in the assembly are easily corrected.

The nature of the present invention and its industrial implementation having been sufficiently described, it need only be added that changes of shape, material, and arrangement may be made to the whole and the component parts thereof without such alterations entailing a substantial variation thereof.

The applicant, covered by International Agreements on Industrial Property, reserves the right to extend this application to foreign countries, if possible, claiming the same priority as that of the present application.

What is claimed is:

1. A power transmission device, comprising a housing having means for mounting a motor so that the projected axis of the motor shaft extends into the housing, a first housing portion extending from the motor mount generally in the same direction as the motor shaft axis and carrying a first driven shaft extending perpendicular to the axis of the motor shaft, and a second housing portion extending generally perpendicular to the axis of the motor shaft and carrying a second driven shaft extending generally parallel to the motor shaft axis, a motor support shaped and dimensioned for mounting onto the motor mount of the housing, said motor support carrying a shaft support and a driving shaft positioned for connecting onto the end of the motor shaft in alignment therewith, said driving shaft and the first driven shaft having engaging driving gears, said driving shaft and the second driven shaft having aligned pulleys, wherein said motor mount allows transverse adjustment of the driving shaft to allow adjustment of the spacing of said pulleys, said engaged driving gears being movable axially in relation to the first driven shaft to allow such adjustment.

* * * * *